US007460379B2

(12) United States Patent
Yao et al.

(10) Patent No.: US 7,460,379 B2
(45) Date of Patent: Dec. 2, 2008

(54) ELECTRICAL CIRCUIT WITH VOLTAGE MULTIPLIER FOR FACILITATING IGNITION OF A GAS DISCHARGE LAMP

(75) Inventors: Xiaoli Yao, Shanghai (CN); Rajendra Kumar Pokharna, Columbia, MD (US); Viktor Karoly Varga, Solon, OH (US); Chao Yang, Shanghai (CN); Yingqi Zhang, Shanghai (CN)

(73) Assignee: General Electric Company, Niskayuna, NY (US)

( * ) Notice: Subject to any disclaimer, the term of this patent is extended or adjusted under 35 U.S.C. 154(b) by 284 days.

(21) Appl. No.: 11/469,945

(22) Filed: Sep. 5, 2006

(65) Prior Publication Data

US 2008/0055939 A1 Mar. 6, 2008

(51) Int. Cl.
*H02M 3/18* (2006.01)
*H01J 11/04* (2006.01)

(52) U.S. Cl. ........................................ 363/59; 315/352

(58) Field of Classification Search ............. 363/15–17, 363/59, 60, 95, 97, 131, 132; 315/200 R, 315/206–208, 219, 209 T, 209 CD, 291, 306, 315/326, 349, 352, 354, DIG. 7
See application file for complete search history.

(56) References Cited

U.S. PATENT DOCUMENTS

| | | | | |
|---|---|---|---|---|
| 5,367,227 | A | 11/1994 | Gademann et al. | |
| 5,892,332 | A | 4/1999 | Drews et al. | |
| 5,894,202 | A | 4/1999 | Betz et al. | |
| 6,057,650 | A * | 5/2000 | Betz et al. | 315/289 |
| 6,075,327 | A | 6/2000 | Albou | |
| 6,144,171 | A | 11/2000 | Clements et al. | |
| 6,181,081 | B1 | 1/2001 | Hirschmann et al. | |
| 6,188,180 | B1 | 2/2001 | Diamond | |
| 6,204,611 | B1 * | 3/2001 | Bouwman et al. | 315/290 |
| 6,366,030 | B1 * | 4/2002 | Ito et al. | 315/291 |
| 6,392,363 | B1 | 5/2002 | Decker | |
| 6,583,585 | B2 | 6/2003 | Takeda et al. | |

(Continued)

FOREIGN PATENT DOCUMENTS

EP 0933977 A2 8/1999

(Continued)

*Primary Examiner*—Matthew V Nguyen
(74) *Attorney, Agent, or Firm*—Paul J. DiConza

(57) ABSTRACT

An ignition circuit and method, as may be used for igniting a gas discharge lamp, are provided. The circuit includes a voltage multiplier circuit connected to receive a signal corresponding to a DC bus voltage level from a rectifier circuit. The voltage multiplier circuit includes first and second voltage storing circuits configured to each respectively store a voltage level corresponding to a first multiple of the DC bus voltage level (e.g., at least twice the DC bus voltage level). The voltage multiplier circuit further includes a peak voltage holding circuit connected to the first and second voltage storing circuits to accumulate a voltage level corresponding to a second multiple of the DC bus voltage level (e.g., at least four times the DC bus voltage level). The circuit further includes an ignition module having a transformer selectively connected by way of a switch to the voltage multiplier circuit through a primary winding to receive the voltage accumulated at the peak voltage holding circuit, and thereby generate an ignition pulse voltage applied to the lamp through a secondary winding of the transformer.

19 Claims, 2 Drawing Sheets

U.S. PATENT DOCUMENTS

| | | | | |
|---|---|---|---|---|
| 7,071,632 B2 * | 7/2006 | Ohsawa | ...................... | 315/276 |

FOREIGN PATENT DOCUMENTS

| | | |
|---|---|---|
| EP | 0933976 B1 | 3/2000 |
| EP | 1086609 | 3/2001 |
| EP | 1056315 B1 | 7/2003 |
| EP | 1056314 B | 9/2003 |
| JP | 2002329 | 11/2002 |

* cited by examiner

ELECTRICAL CIRCUIT WITH VOLTAGE MULTIPLIER FOR FACILITATING IGNITION OF A GAS DISCHARGE LAMP

FIELD OF THE INVENTION

The present invention is generally related to electrical circuits, and, more particularly, to a circuit that provides a voltage multiplier effect, such as may be used to facilitate ignition of a gas discharge lamp.

BACKGROUND OF THE INVENTION

It is known that in lighting ignition circuits for igniting a gas discharge lamp, such as an automotive high intensity discharge (HID) headlamp, the ignition voltage is traditionally obtained by resistance-capacitance (R-C) networks, or other voltage-conditioning networks at the ballast side of the lighting ignition circuit. An ignition pulse can be generated across the lamp when the primary winding of a high voltage (HV) ignition transformer receives a voltage from the R-C network or the voltage-conditioning network.

One common disadvantage of such ignition circuits is that, unless a relatively high turn-ratio HV ignition transformer is utilized, the voltage from the R-C network or the voltage-conditioning network (applied at the primary side of the HV transformer) is not sufficiently high to develop the required break down voltage across a spark gap in series with the primary side of the HV transformer. As a consequence of using a transformer with a high turn-ratio, the electromagnetic coupling effected between the primary and secondary windings of the HV transformer is somewhat lossy. Moreover, having to use a high turn-ratio HV transformer increases the costs of assembly and/or manufacturing of the HV transformer, and also leads to increases in the size and weight of the transformer. Thus, it is desirable to provide a lighting ignition circuit that in a cost-effective manner addresses the foregoing issues.

BRIEF DESCRIPTION OF THE INVENTION

Generally, the present invention fulfills the foregoing needs by providing in one aspect thereof an ignition circuit as may be used for igniting a gas discharge lamp. The circuit includes a voltage multiplier circuit connected to receive a signal corresponding to a DC bus voltage level from a rectifier circuit. The voltage multiplier circuit includes first and second voltage storing circuits configured to each respectively store a voltage level corresponding to at least twice the DC bus voltage level. The voltage multiplier circuit further includes a peak voltage holding circuit connected to the first and second voltage storing circuits to accumulate a voltage level corresponding to at least four times the DC bus voltage level. The circuit further includes an ignition module having a transformer selectively connected by way of a switch to the voltage multiplier circuit through a primary winding to receive the voltage accumulated at the peak voltage holding circuit, and thereby generate an ignition pulse voltage applied to the lamp through a secondary winding of the transformer.

BRIEF DESCRIPTION OF THE DRAWINGS

These and other advantages of the invention will be more apparent from the following description in view of the drawings that show.

DETAILED DESCRIPTION OF THE INVENTION

Figure 1:
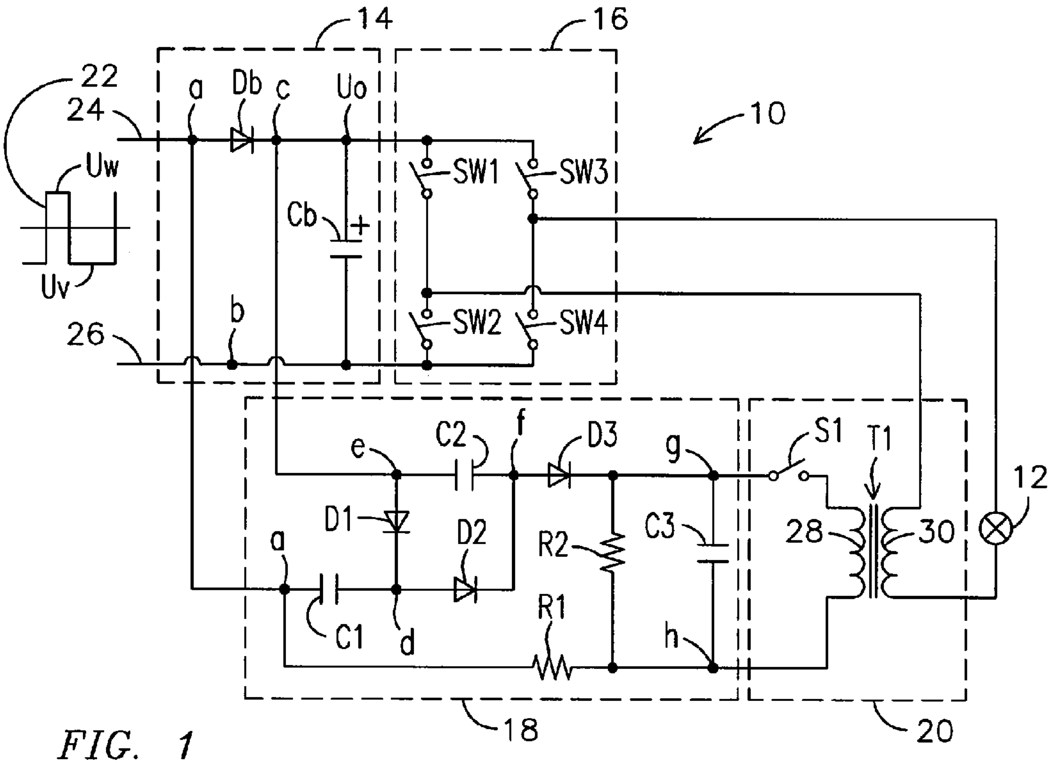
FIG. 1 is a block diagram of an electrical circuit embodying aspects of the present invention, as may be used for igniting a gas discharge lamp.

FIG. 1 is block diagram of an electrical circuit 10 for igniting a gas discharge lamp 12, such as an automotive high intensity discharge (HID) lamp, metal halide HID lamp, and other kinds of HID lamps. It will be appreciated that a circuit embodying aspects of the present invention can be used for high voltage applications other than for igniting a gas discharge lamp. Examples of such other applications may be a specialty high output power supply, such as a high voltage power supply for cutting and striking arc machine, etc. Accordingly, although the description below focuses on a lighting application, such description should be viewed as an example and should not be construed in a limiting sense.

In one example embodiment, circuit 10 comprises a rectifier circuit 14, such as a diode rectifier Db and a capacitor Cb. Rectifier circuit 14 is connected to an inverter 16, such as may comprise in one example embodiment four power switches SW1-SW4 connected in a full-bridge inverter configuration. Rectifier circuit 14 is further connected to a voltage multiplier circuit 18, which in turn is connected to a voltage pulse module 20 (e.g., an ignition module). Lamp 12 is connected to receive respective signals from inverter circuit 16 during steady state operation, and from ignition module 20 during a lamp starting (e.g., ignition) condition. The principle of operation of circuit 10 is explained below in the context of a four-wire connection configuration, as seen in the example embodiment of FIG. 1.

Figure 2:
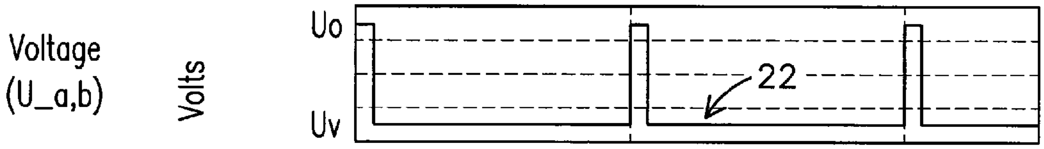
FIGS. 2-7 show respective plots of example waveforms that may be used for illustrating principles of operation of the circuits of FIG. 1 and FIG. 8.

FIG. 2 is a plot of an example input waveform 22 as may be applied to the input terminals 24 and 26 of rectifier circuit 14. For example, waveform 22 may comprise a square wave signal with peak-to-peak variation from a negative peak voltage represented by Uv (e.g., a voltage level for the negative peak of the square waveform) to a positive peak voltage represented by Uw (e.g., a voltage level for the positive peak of the square waveform) and may be generated by a suitable variable voltage source, such as a DC-to-DC converter, or an AC-to-DC converter.

Figure 3:
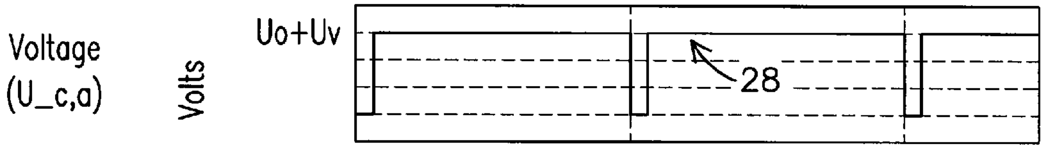
Figure 4:
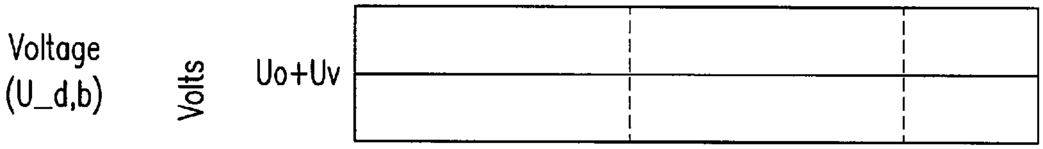

FIG. 3 is a plot of an example waveform 28 as may develop across rectifier diode Db in response to input waveform 22. Referring to FIGS. 1-3, when waveform 22 is in a negative polarity state, the rectifier diode Db will be in a non-conductive state and undertake a reverse voltage (voltage across the circuit nodes labeled with the letters c and a) equal to Uo+Uv, wherein Uo represents the output voltage of rectifier circuit 14, i.e., the DC bus voltage. Then, as shown in FIG. 4, a first capacitor C1 in voltage multiplier circuit 18 will be charged through a diode D1 to a voltage equal to Uo+Uv.

Figure 5:
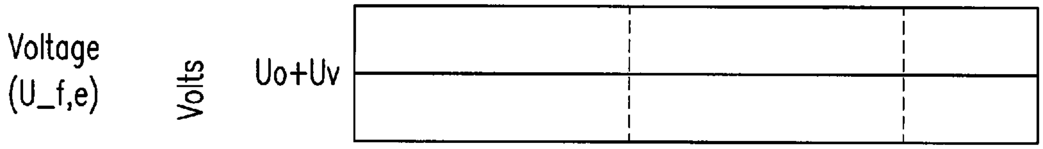

When waveform 22 is in a positive polarity state, rectifier Db will switch to a conductive state and a second capacitor C2 in voltage multiplier circuit 18 will be in parallel circuit with first capacitor C1 through a diode D2. As shown in FIG. 5, the voltage of second capacitor C2 will in turn gradually charge to the voltage Uo+Uv.

Figure 6:
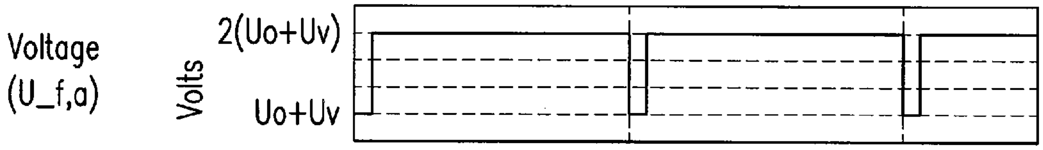
Figure 7:
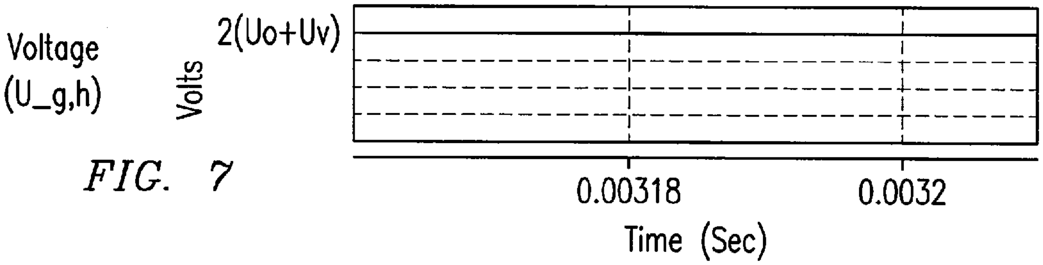

When diode D2 is turned off, first capacitor C1 in series circuit with capacitor C2 will charge a third capacitor C3 through a diode D3 and a resistor R1. It will be appreciated that diode D3, resistor R1 and third capacitor C3 function as a peak voltage holding circuit. FIG. 6 illustrates the voltage waveform that forms across the circuit nodes labeled with the letters f and a, and this waveform constitutes an input to such peak holding circuit. As seen in FIG. 7, the voltage that will develop across capacitor C3 is equal to 2(Uo+Uv). A resistor R2 provides a discharge path for the capacitor C3.

For example, in a case where input waveform 22 is derived in a DC/DC converter of a type generally referred as a flyback converter. In this example, Uv=nUin, Uw=Uo, and the turn-ratio n of a transformer in the flyback converter is defined by the following equation: n=(1−d)Uo/(dUin), wherein Uin represents the input voltage to the flyback converter, and d represents the duty cycle of the flyback converter. Presuming that the duty cycle is 0.5, then n=Uo/Uin, and in this case Uv=Uo. Thus, in this case the voltage that develops across third capacitor C3 is equal to 4 Uo. It will be appreciated that in a practical implementation the turn-ratio can be designed, if so desired, to be larger than the ratio Uo/Uin, and thus the voltage that will develop across third capacitor C3 in some cases can be higher than 4 Uo. In this example, the voltage multiplying effect depends on the selection of the duty cycle d and turn-ratio n. It will be understood that the present invention is not restricted to any particular architecture for generating the input waveform 22, since other converter architectures may be used, such as center-tap boost converter, sepic converter, etc. For readers desirous of general background information regarding examples of converter architectures reference is made to textbook titled "Power Electronics Circuits, Devices and Applications, 2nd Ed., by M. H. Rashid, which textbook was published by Prentice-Hall, Inc., and is herein incorporated by reference.

Once the voltage level across third capacitor C3 is sufficiently close to the voltage level defined by 2(Uo+Uv) (e.g., four times the DC bus voltage), a switch S1 will be actuated to a conductive state and the electrical energy stored in capacitor C3 will be transferred to the primary side of HV transformer T1. It will be appreciated that switch S1 is used as a generic representation of various examples of switching means, such as a spark gap, break down diode, sidac, thyristor, insulated gate bipolar transistor (IGBT), metal oxide semiconductor field effect transistor (MOSFET), relay, etc. At the secondary side of HV transformer T1, a high voltage pulse (e.g., >25 kv) will be generated so that lamp 12 is ignited. It is contemplated that ignition circuit 10 can realize a hot re-strike of HID lamp 12.

It will be appreciated that one advantageous aspects of a circuit embodying aspects of the present invention is that with straightforward and relatively low-cost circuitry one is able to apply to the primary voltage of the HV transformer multiple times the available DC bus voltage.

A corollary of the foregoing advantage is that the turn-ratio of HV transformer T1 can be reduced and this is conducive to achieving cost-savings in the assembly and manufacturing of such a transformer. Furthermore, the size and weight of transformer T1 can also be advantageously reduced. As will also be appreciated by those skilled in the art, the electromagnetic coupling effected between the primary and secondary sides of the HV transformer is also more efficient as compared to a transformer with a higher turn-ratio.

For example, presuming an implementation that quadruples the DC bus voltage, and further presuming that the available DC bus voltage level is 400V, then the primary voltage applied to the HV transformer is 1600V. If the desired secondary voltage is approximately 25 kV, then the turn-ratio of the HV transformer can be conceptually set to 16, If the number of turns used in the primary winding is three, then the number of turns of the secondary can be set to 48 turns. The assembly and manufacture of such a transformer becomes simpler and more cost-effective as compared to prior art implementations.

Compare the foregoing example of a circuit embodying aspects of the present invention, with the following example regarding a prior art ignition circuit that lacks a voltage multiplying effect. Once again presuming the DC bus voltage (Uo) is 400V, then in the absence of voltage multiplication, the primary voltage applied to the HV transformer will be 400V. If the desired secondary voltage is also approximately 25 kV, then the turn-ratio will have to be set to at least 62.5, Presuming the number of turns of the primary winding is three, then the number of turns for the secondary winding would have to be set to at least 188 turns.

Another realizable advantage of a circuit embodying aspects of the present invention is that if one were to keep the turn-ratio of the HV transformer unchanged relative to a prior art HV transformer, in this case the required DC bus voltage can be advantageously reduced. This could be advantageous for several reasons, e.g., lower voltage stress to semiconductor electronics, lower step-up ratio for applications where a low input voltage is utilized (e.g. low-voltage battery application), reduced power losses and improved efficiency in power switches.

Figure 8:
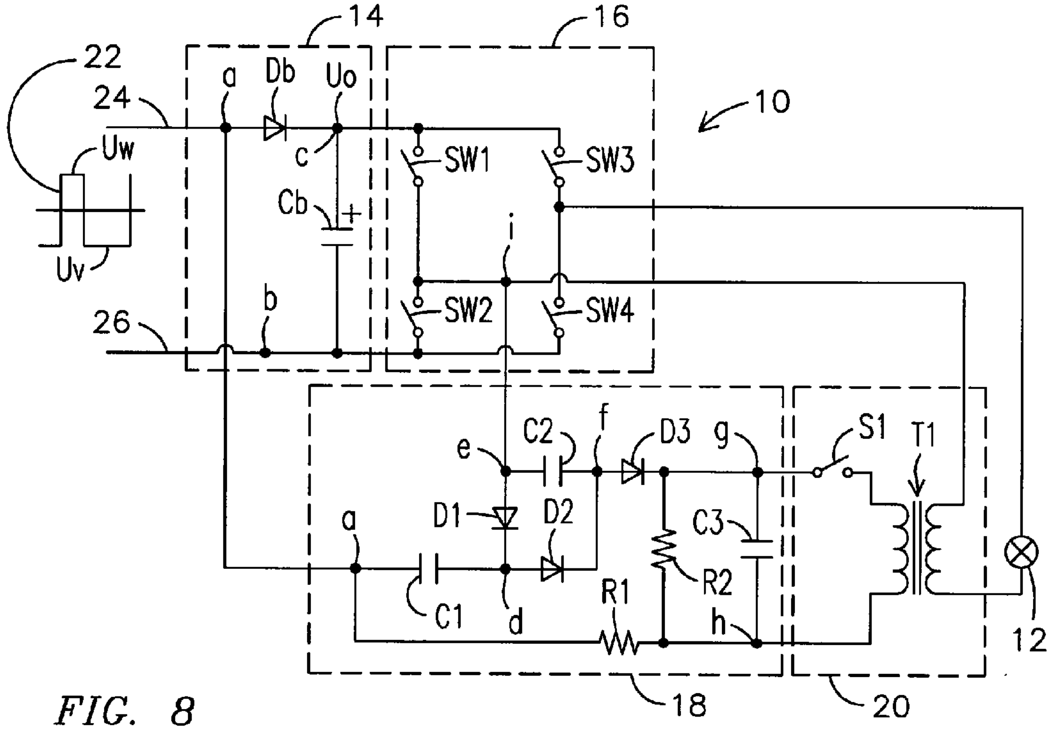
FIG. 8 is block diagram of another embodiment of an electrical circuit for realizing aspects of the present invention.

As shown in FIG. 8, an alternative connection arrangement can be accommodated for a circuit embodying aspects of the present invention. More particularly, one of the input terminals for the voltage multiplier circuit can be changed to connect at node i through power switch SW1 of the inverter circuit. Accordingly, in this example embodiment just three wire connections are needed in lieu of the four wire connections used in the example embodiment of FIG. 1. It will be appreciated that during the ignition phase, in this example embodiment, power switch SW1 in the inverter circuit is set to a conducting state. Then anodes c and i will be electrically connected to one another by way of power switch SW1, and the basic operating principles of the circuit are the same as described above in the context of FIGS. 1-7.

In operation, circuit 10 includes a rectifier circuit 14 responsive to a variable voltage signal (e.g., square wave 22) having a peak voltage corresponding to a DC bus voltage level. A voltage multiplier circuit 18 is connected to the rectifier circuit 18 to receive an output signal from the rectifier circuit, such as the signal depicted in FIG. 3. The voltage multiplier circuit includes first and second voltage storing circuits, such as each respectively comprising a first capacitor C1 and a first diode D1, and second capacitor C2 and a second diode D2. Each voltage storing circuit is respectively configured to store a voltage level corresponding to a first multiple of the DC bus voltage level (e.g., approximately twice the DC voltage and higher in some cases). The voltage multiplier circuit further includes a peak voltage holding circuit made up of a third capacitor C3, a third diode D3 and resistors R1 and R2. The voltage multiplier circuit is connected to the first and second voltage storing circuits to accumulate a voltage level corresponding to a second multiple of the DC bus voltage level, such as approximately four times the DC voltage and higher in some cases. A voltage pulse module 20 includes a transformer T1 connected to the voltage multiplier circuit through a primary winding to selectively receive (e.g., by way of switch S1) the voltage accumulated at the peak voltage holding circuit and generate a voltage pulse having a desired amplitude at a secondary winding of the transformer. In operation, a voltage multiplier effect is achieved by the multiplier circuit with respect to the DC bus voltage level and enables at least one of the following: a reduction from a given turn-ratio ratings in the transformer for generating the voltage pulse with the desired pulse amplitude, and a reduction in the DC voltage level while maintaining the given turn-ratio in the transformer for generating the voltage pulse with the desired amplitude.

While the preferred embodiments of the present invention have been shown and described herein, it will be understood that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A circuit comprising:

a rectifier circuit responsive to a variable voltage signal having a peak voltage corresponding to a DC bus voltage level;

a voltage multiplier circuit connected to the rectifier circuit to receive an output signal from the rectifier circuit, the voltage multiplier circuit comprising first and second voltage storing circuits configured to each respectively store a voltage level corresponding to a first multiple of the DC bus voltage level, and further comprising a peak voltage holding circuit connected to the first and second voltage storing circuits to accumulate a voltage level corresponding to a second multiple of the DC bus voltage level; and a voltage pulse module comprising a transformer connected to the voltage multiplier circuit through a primary winding to selectively receive the voltage accumulated at the peak voltage holding circuit and generate a voltage pulse having a desired amplitude at a secondary winding of the transformer, wherein a voltage multiplier effect achieved by the multiplier circuit with respect to the DC bus voltage level enables at least one of the following: a reduction from a given turn-ratio in the transformer for generating the voltage pulse with the desired pulse amplitude, and a reduction in the DC voltage level while maintaining the given turn-ratio in the transformer for generating the voltage pulse with the desired amplitude.

2. The circuit of claim 1 wherein the voltage pulse module comprises an ignition module for igniting a gas discharge lamp.

3. The circuit of claim 1 wherein the first multiple of the DC bus voltage level corresponds to at least twice the DC bus voltage level.

4. The circuit of claim 1 wherein the second multiple of the DC bus voltage level corresponds to at least four times the DC bus voltage level.

5. The circuit of claim 1 wherein the rectifier circuit comprises a rectifier diode, and the output signal from the rectifier circuit comprises a signal across respective anode and cathode terminals of the rectifier diode.

6. The circuit of claim 5 wherein the first voltage storing circuit comprises a first capacitor having a first terminal connected to the anode of the rectifier diode and further comprises a first diode having an anode terminal connected to the cathode terminal of the rectifier diode and further wherein a cathode terminal of the first diode is connected to a second terminal of the first capacitor.

7. The circuit of claim 6 wherein the second voltage storing circuit comprises a second capacitor having a first terminal connected in parallel circuit to the anode of the first diode and to the cathode terminal of the rectifier diode, and further comprises a second diode having an anode terminal connected in parallel circuit to the second terminal of the first capacitor and to the cathode terminal of the first diode, and a cathode terminal connected in parallel circuit to the second terminal of the second capacitor.

8. The circuit of claim 7 wherein the peak voltage holding circuit comprises a third diode having an anode terminal connected in parallel circuit to the second terminal of the second capacitor and to the cathode terminal of the second diode, and further comprises a third capacitor having a first terminal connected to the cathode terminal of the third diode and a second terminal connected to the first terminal of the first capacitor through a resistor.

9. The circuit of claim 8 wherein a voltage accumulated across the respective terminals of the third capacitor constitutes the voltage accumulated by the peak voltage holding circuit.

10. The circuit of claim 1 wherein the voltage pulse module further comprises switching means for selectively applying the voltage accumulated by the peak voltage holding circuit to the primary winding of the transformer.

11. An ignition circuit for igniting a gas discharge lamp, the circuit comprising:

a rectifier circuit responsive to a variable voltage signal having a peak voltage corresponding to a DC bus voltage level;

a voltage multiplier circuit connected to the rectifier circuit to receive an output signal from the rectifier circuit, the voltage multiplier circuit comprising first and second voltage storing circuits configured to each respectively store a voltage level corresponding to at least twice the DC bus voltage level, and further comprising a peak voltage holding circuit connected to the first and second voltage storing circuits to accumulate a voltage level corresponding to at least four times the DC bus voltage level; and an ignition module comprising a transformer selectively connected by way of a switch to the voltage multiplier circuit through a primary winding to receive the voltage accumulated at the peak voltage holding circuit, and thereby generate an ignition pulse voltage applied to the lamp through a secondary winding of the transformer.

12. The circuit of claim 11 wherein the rectifier circuit comprises a rectifier diode, and the output signal from the rectifier circuit comprises a signal across an anode terminal and a cathode terminal of the rectifier diode.

13. The circuit of claim 12 wherein the first voltage storing circuit comprises a first capacitor having a first terminal connected to the anode of the rectifier diode and further comprises a first diode having an anode terminal connected to the cathode terminal of the rectifier diode and further wherein a cathode terminal of the first diode is connected to a second terminal of the first capacitor.

14. The circuit of claim 13 wherein the second voltage storing circuit comprises a second capacitor having a first terminal connected in parallel circuit to the anode of the first diode and to the cathode terminal of the rectifier diode, and further comprises a second diode having an anode terminal connected in parallel circuit to the second terminal of the first capacitor and to the cathode terminal of the first diode, and a cathode terminal connected in parallel circuit to the second terminal of the second capacitor.

15. The circuit of claim 14 wherein the peak holding circuit comprises a third diode having an anode terminal connected in parallel circuit to the second terminal of the second capacitor and to the cathode terminal of the second diode and further comprises a third capacitor having a first terminal connected to the cathode terminal of the third diode and a second terminal connected to the first terminal of the first capacitor through a resistor.

16. The circuit of claim 11 wherein a voltage accumulated across the third capacitor constitutes the voltage accumulated by the peak voltage holding circuit.

17. A method for igniting a gas discharge lamp comprising:

rectifying in a rectifier circuit a variable voltage signal having a peak voltage corresponding to a DC bus voltage level;

connecting a voltage multiplier circuit to receive an output signal from the rectifier circuit, wherein the voltage multiplier circuit comprises first and second voltage storing circuits;

storing a voltage level corresponding to at least twice the DC bus voltage level in each first and second voltage storing circuit;

connecting a peak voltage holding circuit to the first and second voltage storing circuits;

accumulating in the peak voltage holding circuit a voltage level corresponding to at least four times the DC bus voltage level; and inductively coupling through a transformer the voltage accumulated at the peak voltage holding circuit to generate an ignition voltage pulse applied to the lamp, the ignition pulse having a desired pulse amplitude, wherein a voltage multiplier effect provided by the multiplier circuit with respect to the DC bus voltage level enables a reduction from a given turn-ratio in the transformer for generating the ignition pulse of the desired amplitude.

18. A method for igniting a gas discharge lamp comprising:

rectifying in a rectifier circuit a variable voltage signal having a peak voltage corresponding to a DC bus voltage level;

connecting a voltage multiplier circuit to receive an output signal from the rectifier circuit, wherein the voltage multiplier circuit comprises first and second voltage storing circuits;

storing a voltage level corresponding to at least twice the DC bus voltage level in each first and second voltage storing circuit;

connecting a peak voltage holding circuit to the first and second voltage storing circuits;

accumulating in the peak voltage holding circuit a voltage level corresponding to at least four times the DC bus voltage level; and inductively coupling through a transformer the voltage accumulated at the peak voltage holding circuit to generate an ignition voltage pulse applied to the lamp, the ignition pulse having a desired pulse amplitude, wherein a voltage multiplier effect provided by the multiplier circuit with respect to the DC bus voltage level enables a reduction in the DC voltage level while maintaining a given turn-ratio in the transformer for generating the ignition pulse with the desired amplitude.

19. An ignition circuit for igniting a gas discharge lamp, the circuit comprising:

a voltage multiplier circuit connected to receive a signal corresponding to a DC bus voltage level from a rectifier circuit, the voltage multiplier circuit comprising first and second voltage storing circuits configured to each respectively store a voltage level corresponding to at least twice the DC bus voltage level, and further comprising a peak voltage holding circuit connected to the first and second voltage storing circuits to accumulate a voltage level corresponding to at least four times the DC bus voltage level; and an ignition module comprising a transformer selectively connected by way of a switch to the voltage multiplier circuit through a primary winding to receive the voltage accumulated at the peak voltage holding circuit, and thereby generate an ignition pulse voltage applied to the lamp through a secondary winding of the transformer.

* * * * *